US011973295B2

(12) United States Patent
Huang et al.

(10) Patent No.: US 11,973,295 B2
(45) Date of Patent: Apr. 30, 2024

(54) HIGH-SPEED CONNECTOR WITH SHIELDING PIECE SURROUNDING SIGNAL PINS AND CONNECTED TO GROUND PINS

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN); Hongji Chen, Dongguan (CN); Huanhuan Shen, Dongguan (CN); Chenhui Zeng, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 0 days.

(21) Appl. No.: 18/317,313

(22) Filed: May 15, 2023

(65) Prior Publication Data

US 2023/0283021 A1 Sep. 7, 2023

Related U.S. Application Data

(63) Continuation of application No. 17/217,265, filed on Mar. 30, 2021, now Pat. No. 11,705,673.

(30) Foreign Application Priority Data

May 5, 2020 (CN) ......................... 202010375194.9

(51) Int. Cl.
*H01R 13/6581* (2011.01)
*H01R 12/73* (2011.01)
(Continued)

(52) U.S. Cl.
CPC ......... *H01R 13/6581* (2013.01); *H01R 12/73* (2013.01); *H01R 13/40* (2013.01);
(Continued)

(58) Field of Classification Search
CPC .... H01R 13/6581; H01R 12/73; H01R 13/40; H01R 13/502; H01R 13/506;
(Continued)

(56) References Cited

U.S. PATENT DOCUMENTS

2020/0366017 A1 11/2020 Blackburn et al.

FOREIGN PATENT DOCUMENTS

CN 201117857 Y 9/2008
CN 101926051 A 12/2010
(Continued)

*Primary Examiner* — Abdullah A Riyami
*Assistant Examiner* — Justin M Kratt
(74) *Attorney, Agent, or Firm* — Birch, Stewart, Kolasch & Birch, LLP

(57) ABSTRACT

A high-speed connector includes an insulating body and a terminal module. The terminal module includes a number of terminal groups. Each terminal group includes a number of ground terminals, a number of signal terminals and two shielding pieces. The ground terminal includes a ground pin. The signal terminal includes a signal pin. Each shielding piece includes a number of convex portions and a number of surrounding portions. The ground pins and the signal pins are distributed in a staggered manner. At least one ground pin is in contact with the convex portions of the two shielding pieces. The surrounding portion surrounds the signal pins. When the ground pins and the signal pins are no longer in the same plane or the same row, the shielding piece can prevent cross-talk among signals, thereby improving the transmission quality.

20 Claims, 14 Drawing Sheets

(51) Int. Cl.

| | |
|---|---|
| ***H01R 13/40*** | (2006.01) |
| ***H01R 13/502*** | (2006.01) |
| ***H01R 13/506*** | (2006.01) |
| ***H01R 13/652*** | (2006.01) |
| ***H01R 13/6585*** | (2011.01) |
| *H01R 12/71* | (2011.01) |
| *H01R 12/72* | (2011.01) |
| *H01R 13/514* | (2006.01) |
| *H01R 13/6461* | (2011.01) |
| *H01R 13/6471* | (2011.01) |
| *H01R 13/648* | (2006.01) |
| *H01R 13/658* | (2011.01) |
| *H01R 13/659* | (2011.01) |
| *H01R 13/6591* | (2011.01) |
| *H01R 13/6594* | (2011.01) |
| *H01R 13/6597* | (2011.01) |

(52) U.S. Cl.

CPC ......... *H01R 13/502* (2013.01); *H01R 13/506* (2013.01); *H01R 13/652* (2013.01); *H01R 13/6585* (2013.01); *H01R 12/71* (2013.01); *H01R 12/712* (2013.01); *H01R 12/716* (2013.01); *H01R 12/72* (2013.01); *H01R 12/721* (2013.01); *H01R 12/724* (2013.01); *H01R 13/514* (2013.01); *H01R 13/6461* (2013.01); *H01R 13/6471* (2013.01); *H01R 13/648* (2013.01); *H01R 13/658* (2013.01); *H01R 13/659* (2013.01); *H01R 13/6591* (2013.01); *H01R 13/6594* (2013.01); *H01R 13/6597* (2013.01)

(58) Field of Classification Search

CPC .. H01R 13/652; H01R 13/6585; H01R 12/71; H01R 12/712; H01R 12/716; H01R 12/72; H01R 12/721; H01R 12/724; H01R 13/514; H01R 13/6461; H01R 13/6471; H01R 13/648; H01R 13/658; H01R 13/659; H01R 13/6591; H01R 13/6594; H01R 13/6597

See application file for complete search history.

(56) References Cited

FOREIGN PATENT DOCUMENTS

| | | | | |
|---|---|---|---|---|
| CN | 202474339 | U | | 10/2012 |
| CN | 208782167 | U | | 4/2019 |
| CN | 109841981 | A | * | 6/2019 |
| CN | 109980386 | A | * | 7/2019 |
| DE | 20 2011 108 228 | U1 | | 4/2012 |
| TW | I637568 | B | | 10/2018 |
| TW | M582696 | U | | 8/2019 |
| TW | M584554 | U | | 10/2019 |

* cited by examiner

HIGH-SPEED CONNECTOR WITH SHIELDING PIECE SURROUNDING SIGNAL PINS AND CONNECTED TO GROUND PINS

CROSS-REFERENCE TO RELATED APPLICATIONS

This patent application is a continuation of U.S. patent application Ser. No. 17/217,265, filed on Mar. 30, 2021, which claims priority of a Chinese Patent Application No. 202010375194.9, filed on May 5, 2020 and titled "HIGH-SPEED CONNECTOR", the entire content of which is incorporated herein by reference.

TECHNICAL FIELD

The present disclosure relates to a high-speed connector which belongs to a technical field of electrical connectors.

BACKGROUND

With continuous improvement of communication technologies, the requirements for data transmission rate are getting higher and higher. High-speed connectors are widely used in communication technologies. The high-speed connectors are commonly used connectors for large-scale communication equipment, ultra high-performance servers and supercomputers, industrial computers, and high-end storage devices etc. The main function of the high-speed connectors is to transmit high-speed differential signals, single-ended signals and high current etc.

High-speed connectors generally include a plurality of signal terminals and a plurality of ground terminals. When the high-speed connectors are installed on circuit boards, pins of the signal terminals and the ground terminals are inserted into corresponding holes of the circuit boards. Due to limited space of the circuit boards, the holes of the circuit boards are generally arranged in a staggered manner. However, this arrangement of the holes of the circuit boards determines that the signal terminals and the ground terminals are not on the same plane, which will cause serious cross-talk among signals and affect the transmission quality.

SUMMARY

An object of the present disclosure is to provide a high-speed connector with at least one shielding piece to prevent cross-talk from occurring.

In order to achieve the above object, the present disclosure adopts the following technical solution: a high-speed connector, including: an insulating body defining a slot, the slot extending along a longitudinal direction and being configured to receive a daughter card; and a terminal module fixed to the insulating body, the terminal module including a plurality of terminal groups, each terminal group including a plurality of ground terminals, a plurality of signal terminals and two shielding pieces, each ground terminal including a ground contact arm or horizontal portion and a ground pin, each signal terminal including a signal contact arm or horizontal portion and a signal pin, each shielding piece including a plurality of convex portions and a plurality of surrounding portions, and each surrounding portion of a same shielding piece connecting adjacent convex portions of the same shielding piece; wherein the ground contact arms of the plurality of ground terminals and the signal contact arms of the plurality of signal terminals are disposed side-by-side along a transverse direction perpendicular to the longitudinal direction; wherein the ground contact arms of the plurality of ground terminals and the signal contact arms of the plurality of signal terminals extend into the slot for engaging with the daughter card; wherein each shielding piece extends along a vertical direction a height which is much larger than a thickness of each shielding piece extending along the longitudinal direction; and wherein the ground pins and the signal pins are spaced apart and distributed in a staggered manner; the convex portions of one of the two shielding pieces are in contact with corresponding ground terminals on one side, and the convex portions of a remaining one of the two shielding pieces are in contact with the corresponding ground terminals on an opposite side, so that the two shielding pieces form a skirt to surround corresponding signal pins in the vertical direction.

In order to achieve the above object, the present disclosure adopts the following technical solution: a high-speed connector, including: an insulating body; and a terminal module fixed to the insulating body, the terminal module including a plurality of terminal groups, each terminal group including a plurality of ground terminals, a plurality of signal terminals and two shielding pieces, each ground terminal including a ground pin, each signal terminal including a signal pin, each shielding piece including a plurality of convex portions and a plurality of surrounding portions, and each surrounding portion of a same shielding piece connecting adjacent convex portions of the same shielding piece; wherein the ground pins and the signal pins are spaced apart and distributed in a staggered manner; the convex portions of one of the two shielding pieces are in contact with corresponding ground terminals on one side, and the convex portions of a remaining one of the two shielding pieces are in contact with the corresponding ground terminals on an opposite side; and wherein each surrounding portion of one of the two shielding pieces has a first opening; each surrounding portion of a remaining one of the two shielding pieces has a second opening; the first opening and a corresponding second opening form a rectangular opening in which two signal pins reside; and wherein the two signal pins are disposed along a diagonal of the rectangular opening.

In order to achieve the above object, the present disclosure adopts the following technical solution: a high-speed connector, including: an insulating body; and a terminal module fixed to the insulating body, the terminal module including a plurality of terminal groups, each terminal group including a plurality of ground terminals, a plurality of signal terminals and two shielding pieces, each ground terminal including a ground pin, each signal terminal including a signal pin, each shielding piece including a plurality of convex portions and a plurality of surrounding portions, and each surrounding portion of a same shielding piece connecting adjacent convex portions of the same shielding piece; wherein the ground pins and the signal pins are spaced apart and distributed in a staggered manner; the convex portions of one of the two shielding pieces are in contact with corresponding ground terminals on one side, and the convex portions of a remaining one of the two shielding pieces are in contact with the corresponding ground terminals on an opposite side; and wherein the two shielding pieces are of a two-piece configuration and are assembled along opposite directions along a horizontal direction.

Compared with the prior art, the beneficial effect of the high-speed connector of the present disclosure is that when the ground pins and the signal pins are no longer in the same plane or the same row, the two shielding pieces can prevent cross-talk among signals, thereby improving the transmission quality.

DETAILED DESCRIPTION

Figure 1:
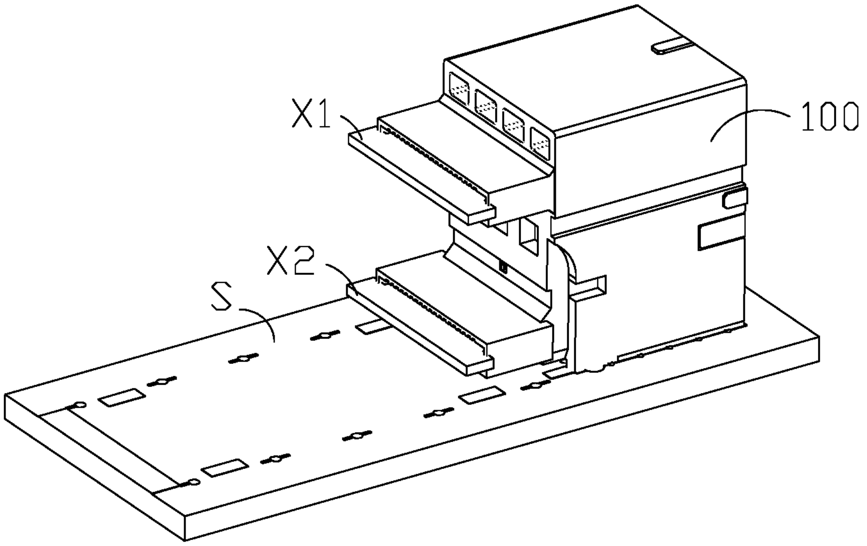
FIG. 1 is a schematic perspective view of a high-speed connector mounted on a circuit board and with daughter cards inserted thereinto, in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Hereinafter, referring to FIGS. 1 to 24, a high-speed connector 100 in accordance with an embodiment of the present disclosure will be described as an example.

Figure 2:
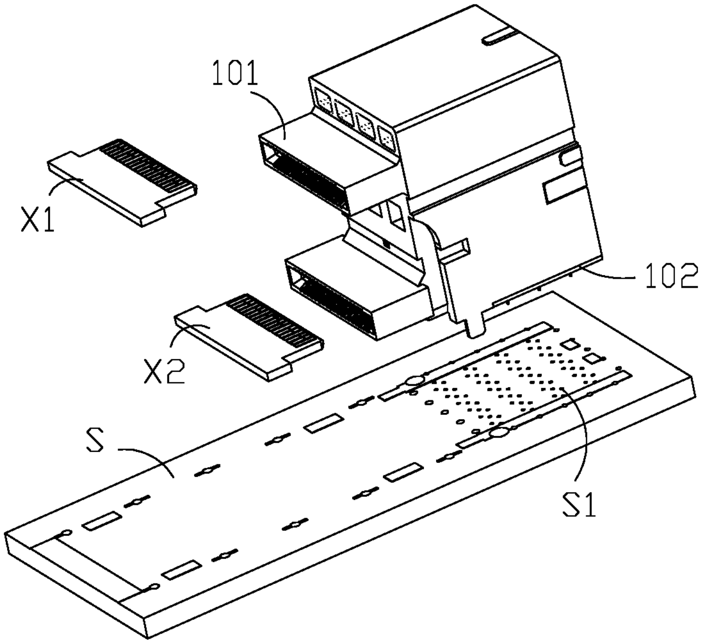
FIG. 2 is an exploded perspective view of the high-speed connector, the daughter cards and the circuit board of FIG. 1.
Figure 3:
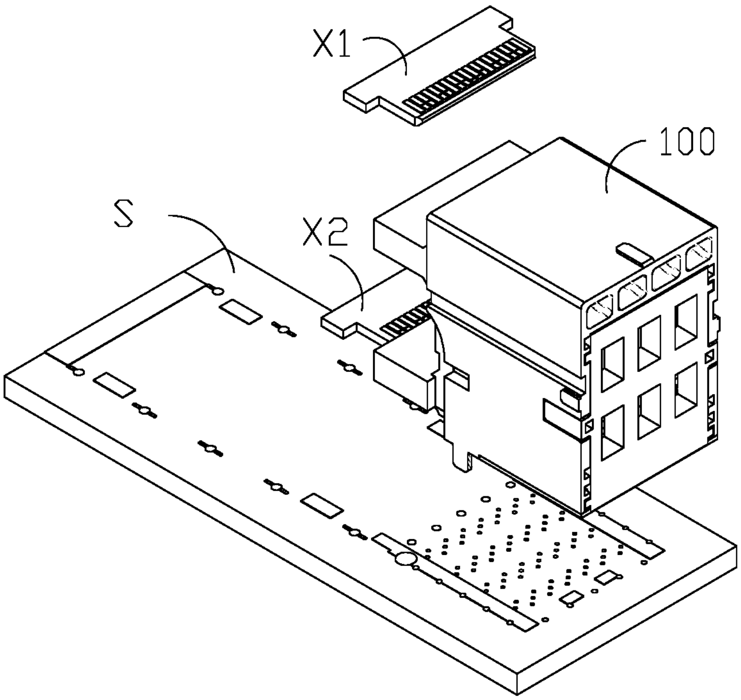
FIG. 3 is an exploded perspective view of FIG. 2 from another angle.

Referring to FIGS. 1 to 3, the present disclosure discloses a high-speed connector 100 which is mounted to a circuit board S for insertion of a first daughter card X1 and a second daughter card X2, so that the first daughter card X1 and the second daughter card X2 can be electrically connected to the circuit board S. The high-speed connector 100 includes a mating end 101 and a mounting end 102. The high-speed connector 100 is mounted to a surface of the circuit board S through the mounting end 102. The mating end 101 defines insertion slots for insertion of the first daughter card X1 and the second daughter card X2. In this embodiment, the high-speed connector 100 is a right-angle connector which is configured to insert the first daughter card X1 and the second daughter card X2 in a direction parallel to the surface of the circuit board S. After the first daughter card X1 and the second daughter card X2 are inserted into the insertion slots of the high-speed connector 100, the first daughter card X1, the second daughter card X2 and the circuit board S are located in parallel. In this embodiment, for the convenience of description and understanding of the present disclosure, a plane parallel to the surface of the circuit board S is set as a horizontal plane, and a direction perpendicular to the surface of the circuit board S is set as a vertical direction which also refers to an up and down direction.

Referring to FIGS. 4 to 9, the high-speed connector 100 includes an insulating body 1, a terminal module 2 and a rear cover 3. The terminal module 2 is assembled to the insulating body 1, and the rear cover 3 is locked with the insulating body 1 so as to fix the terminal module 2 in the insulating body 1. The terminal module 2 includes four terminal groups 4 and a bottom spacer 5. The four terminal groups 4 are arranged in pairs in which three pairs are positioned by the bottom spacer 5. Each terminal group 4 includes a plurality of ground terminals 41, a plurality of signal terminals 42, an insulating seat 43 and a shielding piece 44. The ground terminals 41 and the signal terminals 42 are fixed to the insulating seat 43, and the shielding piece 44 is mounted to the insulating seat 43. The shielding piece 44 is used to contact the ground terminals 41 and shield the signal terminals 42. Each ground terminal 41 includes a ground pin 411, and each signal terminal 42 includes a signal pin 421. The ground pins 411 and the signal pins 421 are arranged in a staggered manner. That is, the ground pins 411 are arranged in a row, the signal pins 421 are divided into two rows and arranged on both sides of the row where the ground pins 411 are located, and the ground pins 411 and the signal pins 421 are arranged in different columns. Each terminal group 4 is associated with two shielding pieces 44 which are fixed on opposite sides of the insulating seat 43. Each shielding piece 44 is curved in a wave-shaped configuration. The shielding piece 44 includes a plurality of convex portions 441 and a plurality of surrounding portions 442 surrounded by adjacent convex portions 441. The convex portions 441 are in contact with the ground pins 411. The surrounding portions 442 are located between two adjacent convex portions 441 so that a shielding space is enclosed, and the corresponding signal pins 421 are disposed in the shielding space. One of the shielding piece 44 contacts one side of the ground pins 411 and shields a row of signal pins 421 at intervals, and the other of the shielding piece 44 contacts the other side of the ground pins 411 and shields another row of signal pins 421 at intervals. One or two signal pins 421 can be provided in the surrounding portion 442. The shielding pieces 44 on both sides are symmetrically arranged and do not touch each other directly. The shielding piece 44 is provided with a snap hole 443, the insulating seat 43 is provided with a snap post 431, and the snap post 431 is locked in the snap hole 443 so that the shielding piece 44 is fixed to the insulating seat 43.

Figure 4:
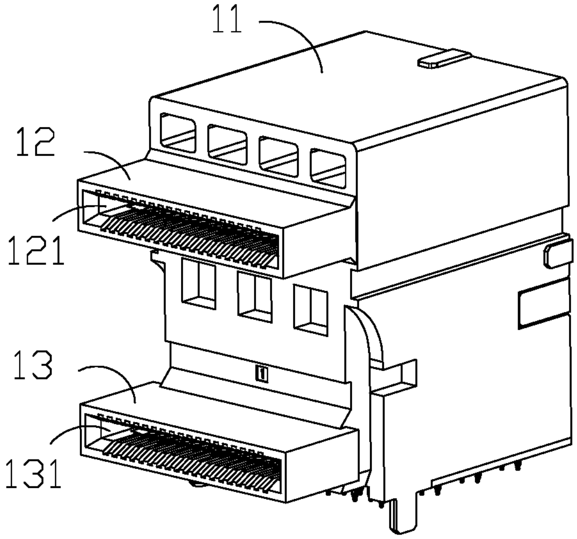
FIG. 4 is a schematic perspective view of the high-speed connector in accordance with an embodiment of the present disclosure.
Figure 5:
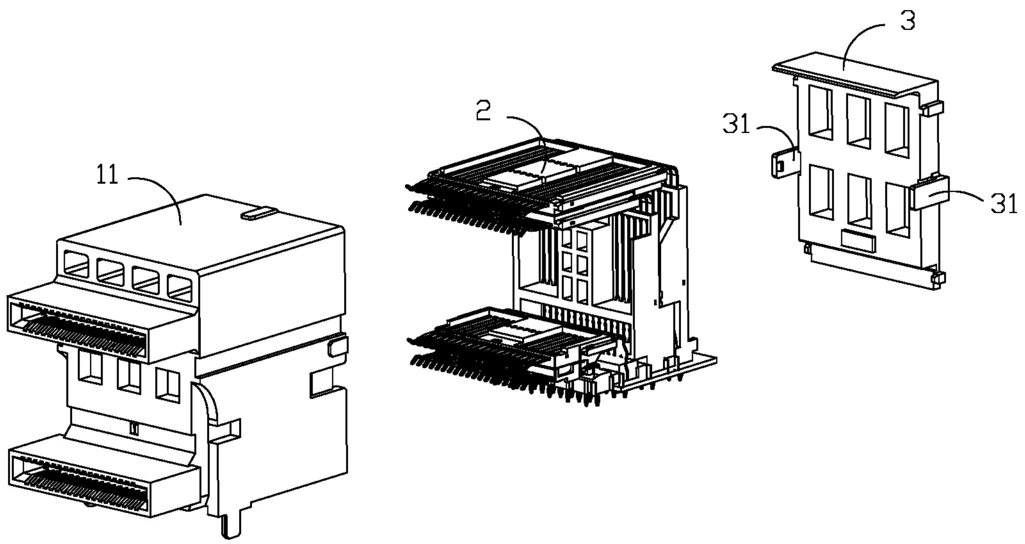
FIG. 5 is a schematic exploded view of the high-speed connector in accordance with an embodiment of the present disclosure.
Figure 6:
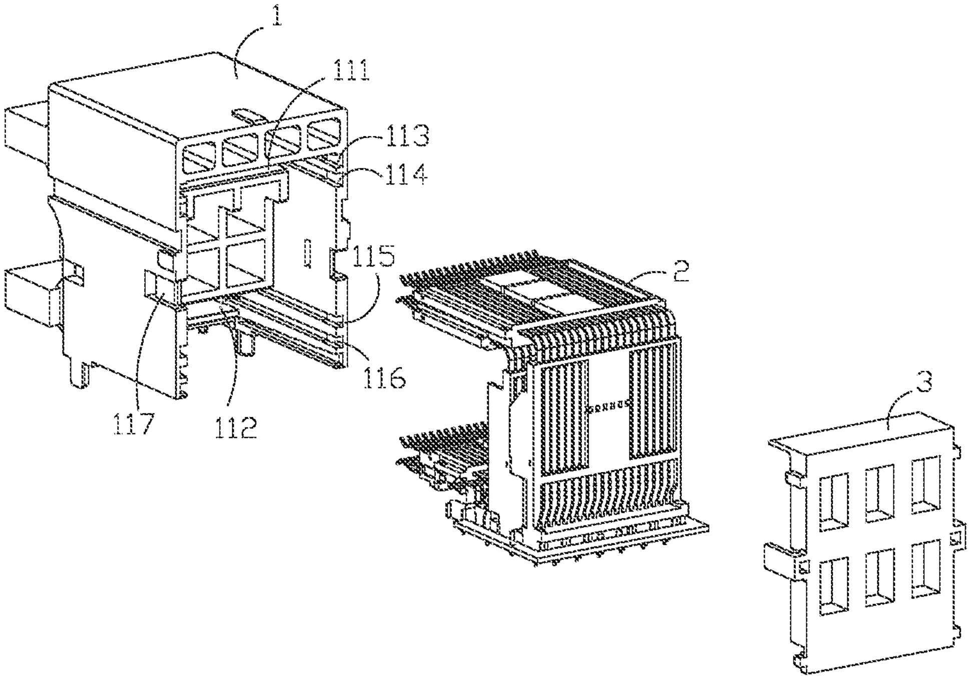
FIG. 6 is an exploded perspective view of FIG. 5 from another angle.
Figure 7:
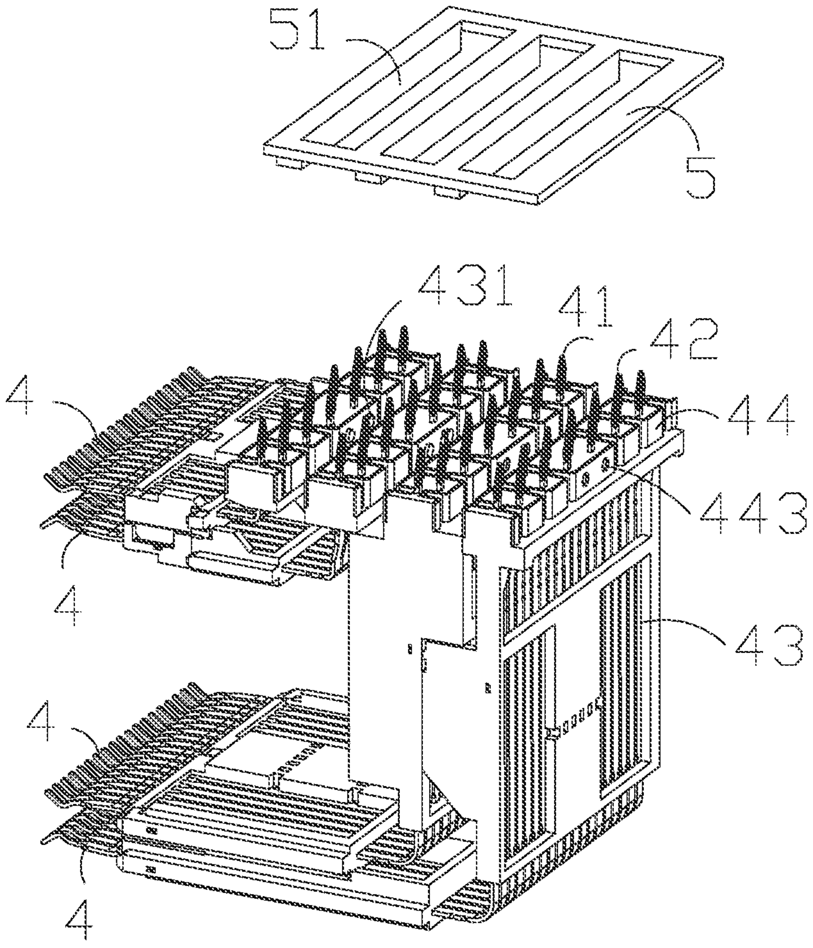
FIG. 7 is an exploded perspective view of a terminal module and a bottom spacer of the high-speed connector in accordance with an embodiment of the present disclosure.
Figure 8:
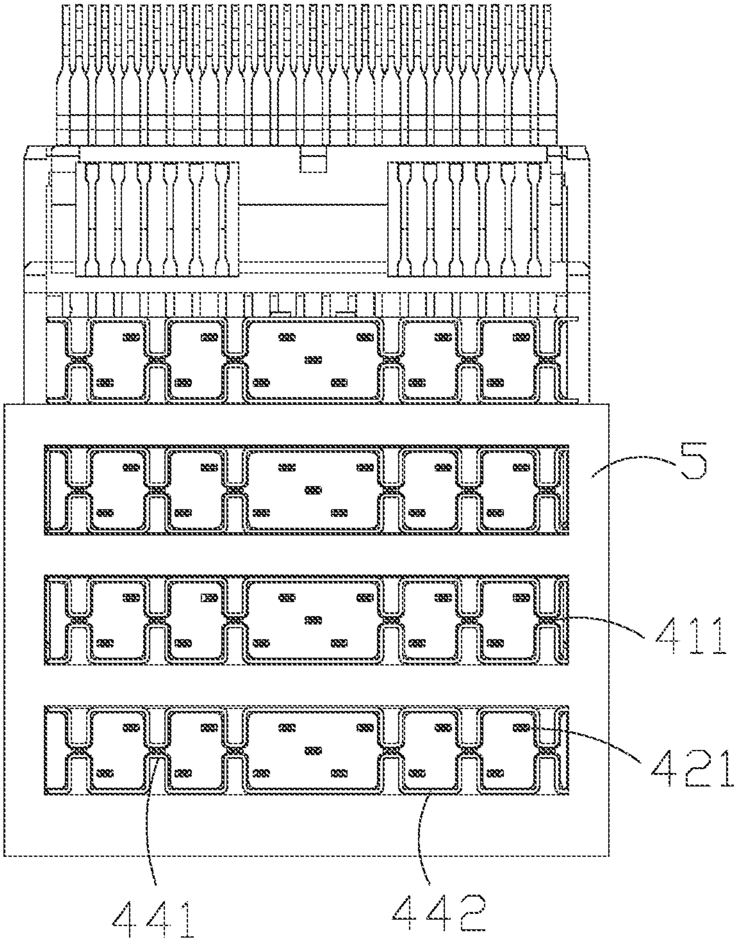
FIG. 8 is a top view of an assembly of FIG. 7 with the bottom bracket assembled to the terminal module.
Figure 9:
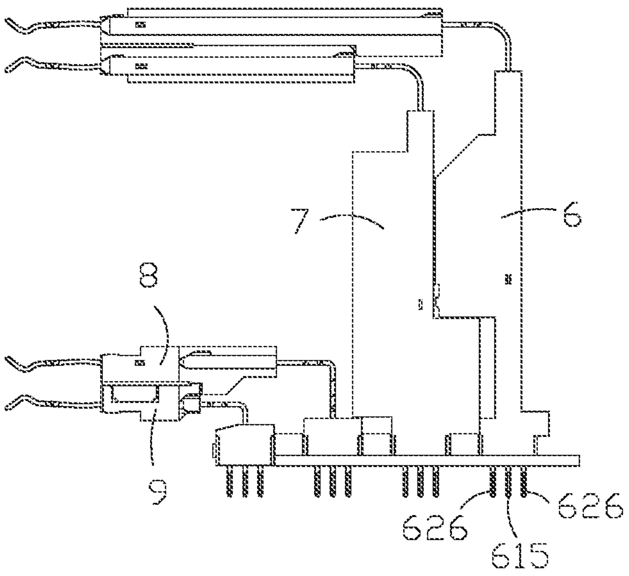
FIG. 9 is a side view of the assembly of FIG. 8 from another angle.
Figure 10:
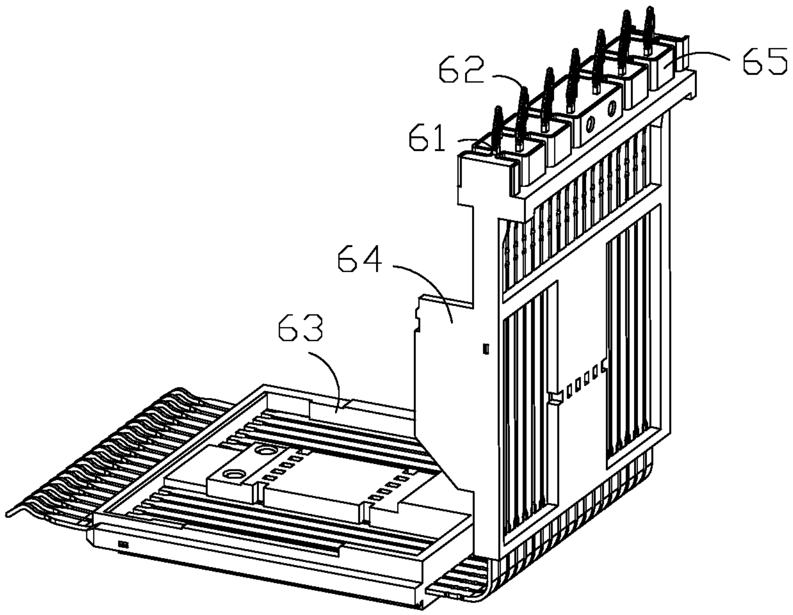
FIG. 10 is a perspective view of a first terminal group of the terminal module of the high-speed connector in accordance with an embodiment of the present disclosure.
Figure 11:
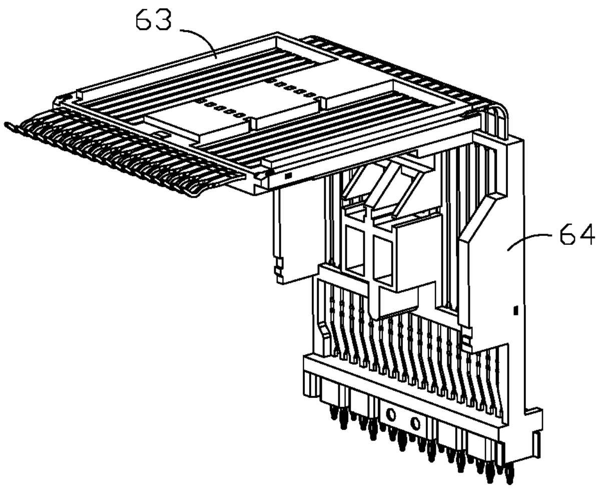
FIG. 11 is another perspective view of FIG. 10 from another angle.
Figure 12:
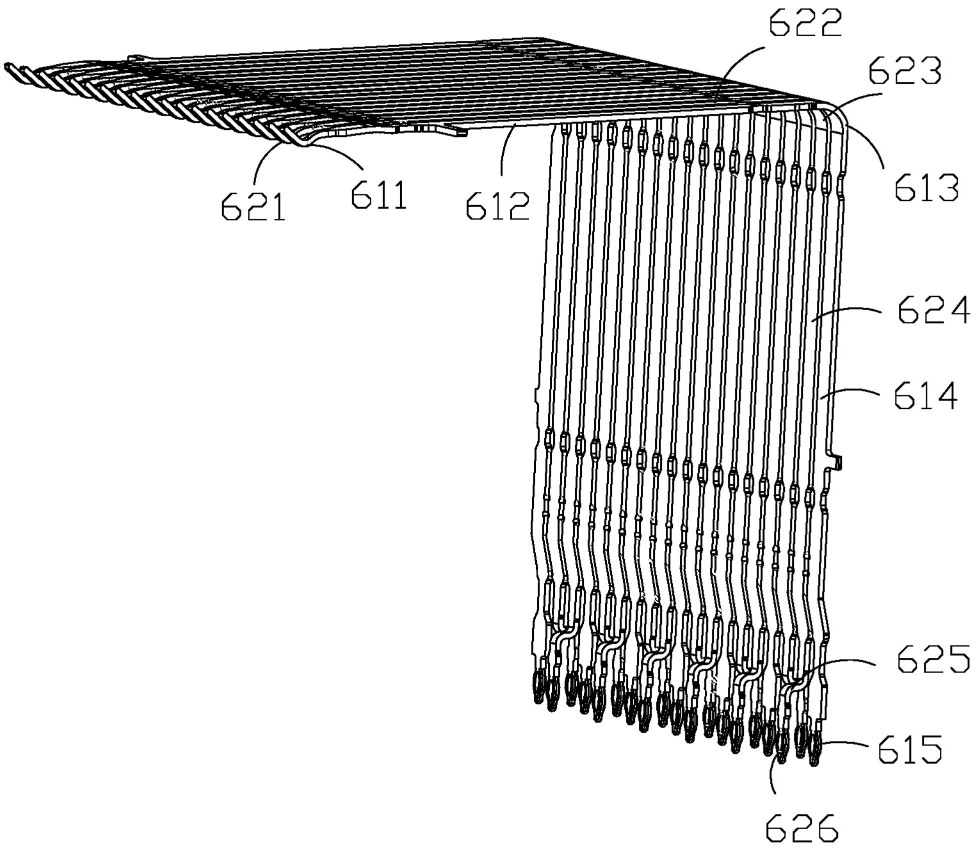
FIG. 12 is a schematic perspective view of a part of the structure of FIG. 10.
Figure 13:
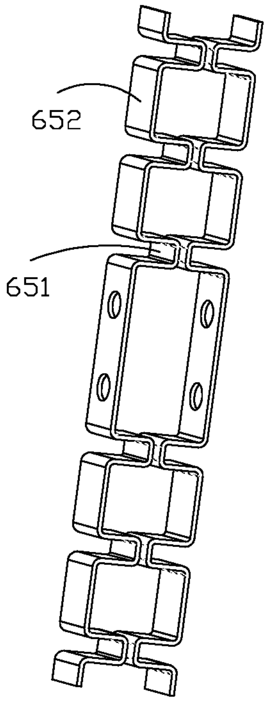
FIG. 13 is a schematic perspective view of another part of the structure of FIG. 10.
Figure 14:
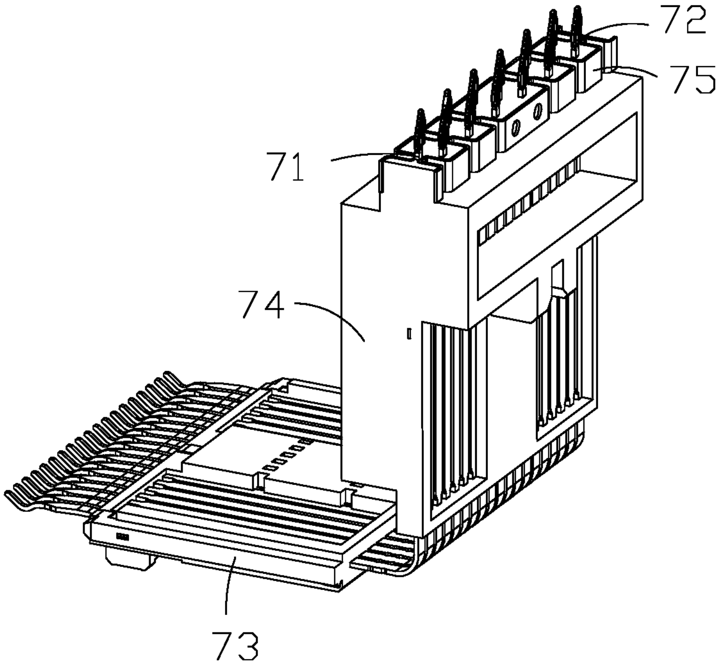
FIG. 14 is a schematic perspective view of a second terminal group of the terminal module of the high-speed connector in accordance with an embodiment of the present disclosure.
Figure 15:
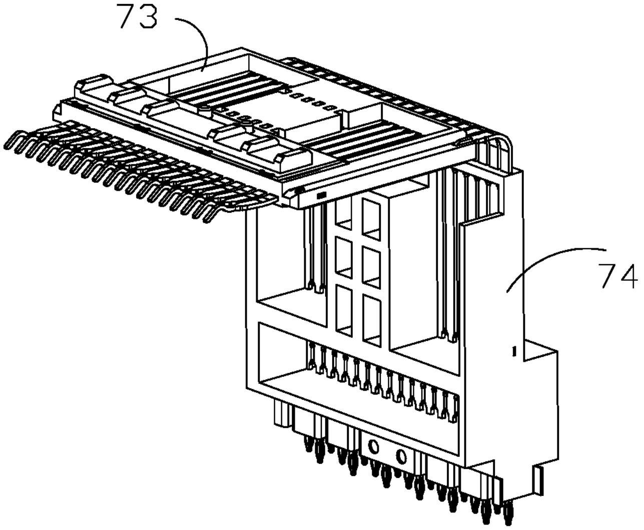
FIG. 15 is a schematic perspective view of FIG. 14 from another angle.
Figure 16:
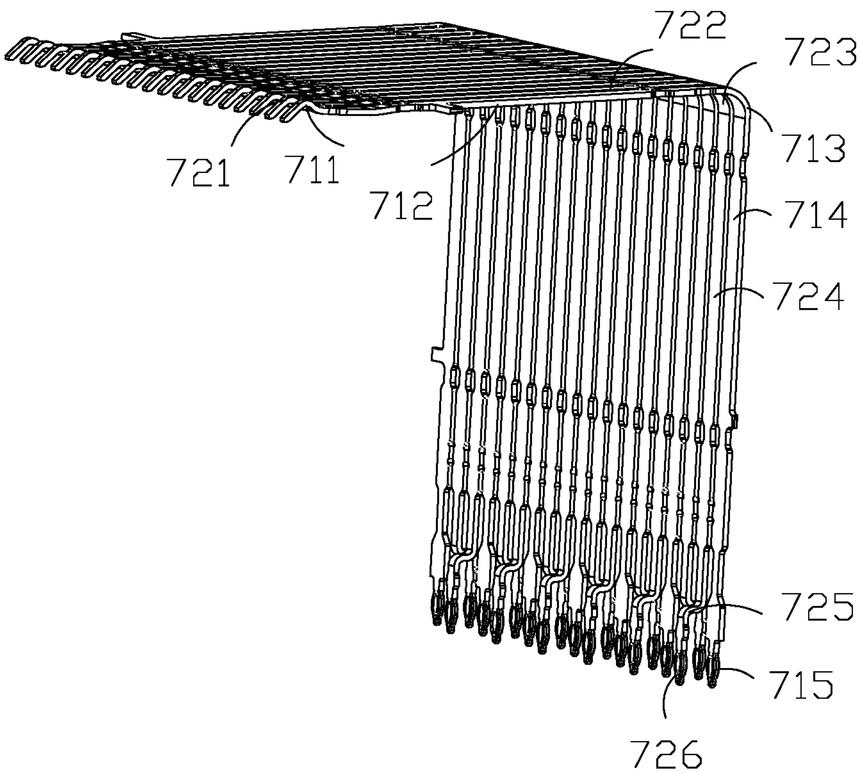
FIG. 16 is a schematic perspective view of a part of the structure of FIG. 14.
Figure 17:
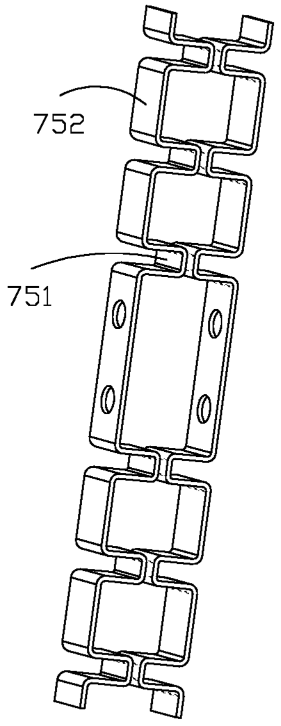
FIG. 17 is a schematic perspective view of another part of the structure of FIG. 14.
Figure 18:
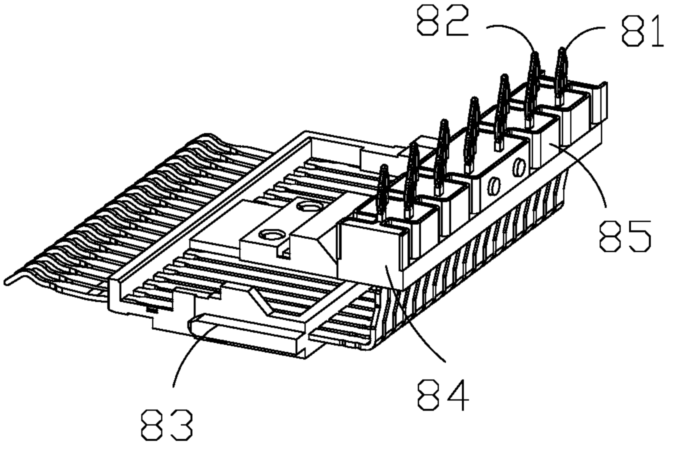
FIG. 18 is a schematic perspective view of a third terminal group of the terminal module of the high-speed connector in accordance with an embodiment of the present disclosure.
Figure 19:
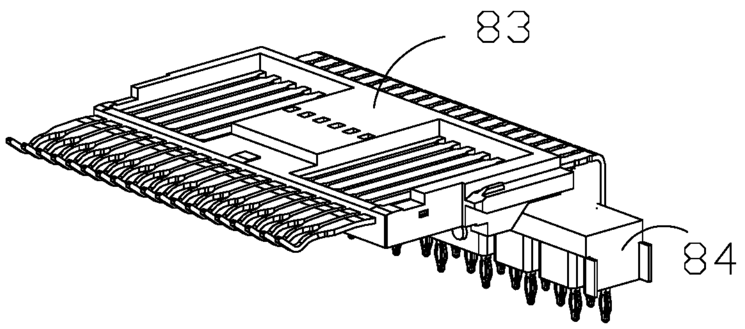
FIG. 19 is a schematic perspective view of FIG. 18 from another angle.
Figure 20:
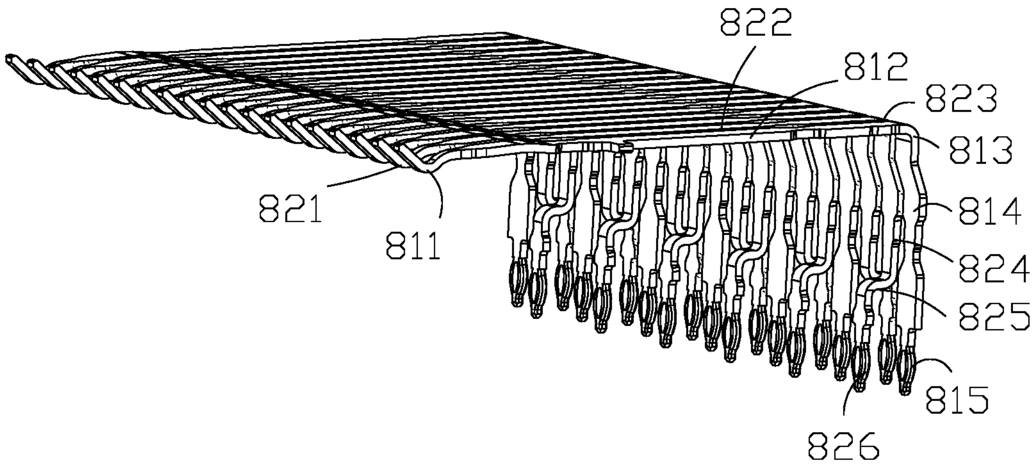
FIG. 20 is a schematic perspective view of a part of the structure of FIG. 18.
Figure 21:
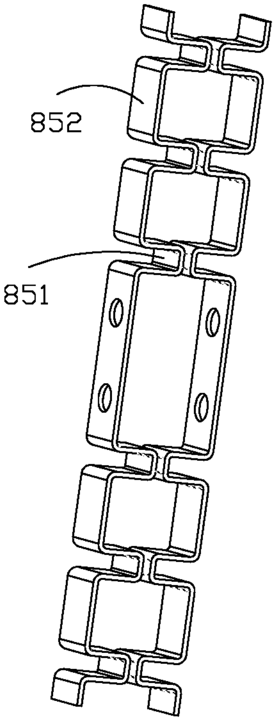
FIG. 21 is a schematic perspective view of another part of the structure of FIG. 18.
Figure 22:
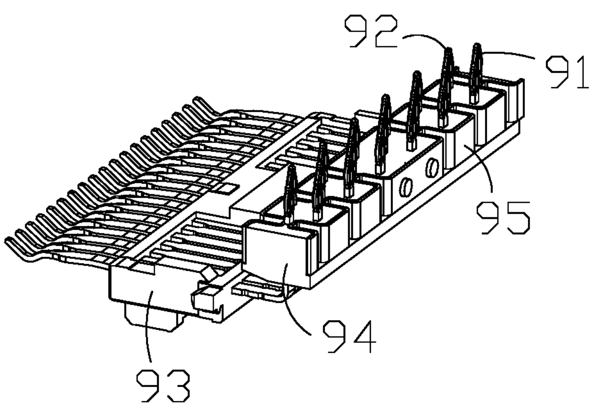
FIG. 22 is a schematic perspective view of a fourth terminal group of the terminal module of the high-speed connector in accordance with an embodiment of the present disclosure.
Figure 23:
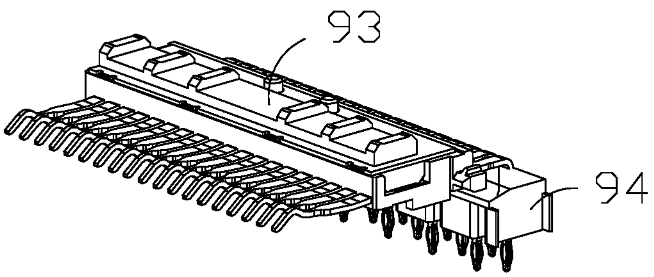
FIG. 23 is a schematic perspective view of the structure of FIG. 22 from another angle.
Figure 24:
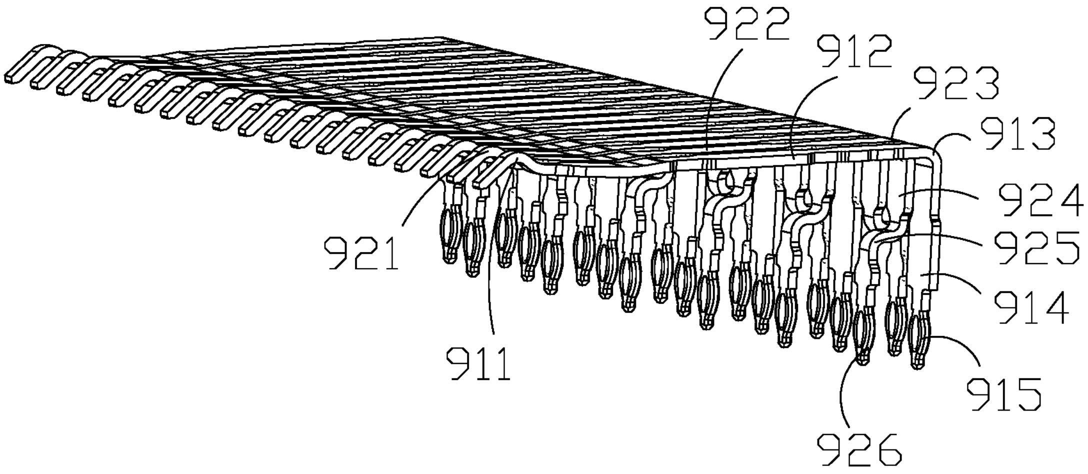
FIG. 24 is a schematic perspective view of a part of the structure of FIG. 22.
Figure 25:
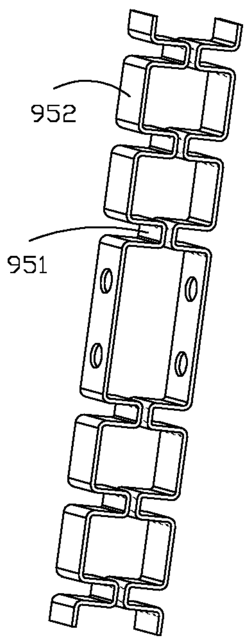
FIG. 25 is a schematic perspective view of another part of the structure of FIG. 22.

Referring to FIGS. 4 to 6, the insulating housing 1 includes a base portion 11, a first insertion portion 12 and a second insertion portion 13. The first insertion portion 12 and the second insertion portion 13 extend forwardly from the base portion 11. The first insertion portion 12 and the second insertion portion 13 are spaced and aligned along the vertical direction perpendicular to the circuit board S. The first insertion portion 12 is provided with a first slot 121 for insertion of the first daughter card X1, and the second insertion portion 13 is provided with a second slot 131 for insertion of the second daughter card X2. A hollow portion inside the base portion 11 includes a first assembly cavity 111 which extends through the first slot 121 and a second assembly cavity 112 which extends through the second slot 131. An inner wall adjacent to the first assembly cavity 111 is provided with a first assembly groove 113 and a second assembly groove 114. The first assembly groove 113 and the second assembly groove 114 are arranged one above the other. An inner wall adjacent to the second assembly cavity 112 is provided with a third assembly groove 115 and a fourth assembly groove 116. The third assembly groove 115 and the fourth assembly groove 116 are arranged one above the other. Two lateral sides of the rear cover 3 are respectively extended with locking arms 31, and two lateral sides of the base portion 11 are provided with locking grooves 117 for locking with the locking arms 31.

Referring to FIGS. 4 to 25, specifically, the terminal groups 4 specifically include a first terminal group 6, a second terminal group 7, a third terminal group 8 and a fourth terminal group 9. The insulating seat 44 includes an insulating horizontal seat arranged horizontally and an insulating vertical seat arranged vertically.

The first terminal group 6 includes a plurality of first ground terminals 61, a plurality of first signal terminals 62, a first insulating horizontal seat 63, a first insulating vertical seat 64, and a first shielding piece 65. Each first ground terminal 61 includes a first contact portion 611, a first horizontal portion 612, a first curved portion 613, a first vertical portion 614, and a first ground pin 615 in sequence. The first ground terminal 61 is of a right-angle configuration, wherein the first contact portion 611 and the first horizontal portion 612 are arranged horizontally, the first vertical portion 614 and the first ground pin 615 are arranged vertically, and the first horizontal portion 612 and the first vertical portion 614 are connected by the first curved portion 613. The first signal terminal 62 includes a first contact portion 621, a first horizontal portion 622, a first curved portion 623, a first vertical portion 624, a first bent portion 625 and a first signal pin 626 in sequence. The first signal terminal 62 is of a right-angle configuration similar to the first ground terminal 61, wherein the first contact portion 621 and the first horizontal portion 622 are arranged horizontally, the first vertical portion 624, the first bent portion 625 and the first signal pin 626 are arranged vertically, and the first horizontal portion 622 and the first vertical portion 624 are connected by the first curved portion 623. The first ground terminals 61 and the first signal terminals 62 are arranged side by side. Specifically, one first ground terminal 61 and two first signal terminals 62 are alternately arranged in sequence. That is, two first signal terminals 62 are provided between two adjacent first ground terminals 61.

The first horizontal portions 612 of the first ground terminals 61 and the first horizontal portions 622 of the first signal terminals 62 are arranged in a row and disposed in the first insulating horizontal seat 63. The first insulating horizontal seat 63 is molded by injection molding and holds a row of first horizontal portions 612 and first horizontal portions 622. The first contact portions 611 extend forwardly from the first horizontal portions 612. The first contact portions 621 extend forwardly from the first horizontal portions 622. The first vertical portions 614 of the first ground terminals 61 and the first vertical portions 624 of the first signal terminals 62 are arranged in a row and disposed in the first insulating vertical seat 64. The first insulating vertical seat 64 is molded by injection molding and holds a row of first vertical portions 614 and first vertical portions 624. Along an arrangement direction, the first ground pins 615 of the first ground terminals 61 extend downwardly from the first vertical portions 614; the first signal pins 626 of the first signal terminals 62 extend downwardly from the first bent portions 625 which are bent to one side from the first vertical portions 624 along a direction that deviates from the arrangement direction. The first signal pins 626 of the other signal terminals 62 extend downwardly from the first bent portions 625 which are bent to the other side from the first vertical portions 624 along a direction that deviates from the arrangement direction. In this way, the first ground terminal 61 and the two first signal terminals 62 are periodically arranged. In addition, the first ground pins 615 of the first ground terminals 61 are arranged in a row, and the first signal pins 626 of the first signal terminals 62 are divided into two rows and located on both sides of the first ground pins 615. The first bent portions 625 of the first signal terminals 62 are fixed in the first vertical seat 64. Preferably, the first ground pins 615 and the first signal pins 626 both have oval fish-eye holes so that the first ground pins 615 and the first signal pins 626 can be pressed into insertion holes S1 of the circuit board S for establish of electrical connection.

In the illustrated embodiment of the present disclosure, two first shielding pieces 65 are provided. The two first shielding pieces 65 are respectively held on both sides of the first insulating vertical seat 64. Each first shielding piece 65 is of a wave-shaped configuration, and includes a convex portion 651 and a surrounding portion 652 between adjacent convex portions 651. The convex portions 651 are in contact with the first ground pins 615. The surrounding portion 652 is of a U-shaped configuration so as to surround one or two first signal pins 626. The first shielding piece 65 includes at least one protrusion 651 in contact with one first ground pin 615. The surrounding portions 652 surround all the first signal pins 626 in one row. The other shielding piece 65 surround all the first signal pins 626 in the other row. The convex portions 651 contact the first ground pins 615 from intervals between the adjacent first signal pins 626. In the illustrated embodiment of the present disclosure, the two first shielding pieces 65 are arranged symmetrically. Two sides of the first ground pin 615 are respectively in contact with the first shielding piece 65, and the surrounding portions 652 of the two first shielding pieces 65 are arranged opposite to each other.

The second terminal group 7 includes a plurality of second ground terminals 71, a plurality of second signal terminals 72, a second insulating horizontal seat 73, a second insulating vertical seat 74 and a second shielding piece 75. Each second ground terminal 71 includes a second contact portion 711, a second horizontal portion 712, a second curved portion 713, a second vertical portion 714, and a second ground pin 715 in sequence. The second signal terminal 72 includes a second contact portion 721, a second horizontal portion 722, a second curved portion 723, a second vertical portion 724, a second bent portion 725 and a second signal pin 726 in sequence. The second shielding piece 75 includes a plurality of convex portions 751 and a plurality of surrounding portions 752. The features of the second terminal group 7 are similar to those of the first terminal group 6, and the positional matching relationships of the components are the same. Details can be referred to the above detailed description, which will not be repeated here.

The third terminal group 8 includes a plurality of third ground terminals 81, a plurality of third signal terminals 82, a third insulating horizontal seat 83, a third insulating vertical seat 84 and a third shielding piece 85. Each third ground terminal 81 includes a third contact portion 811, a third horizontal portion 812, a third curved portion 813, a third vertical portion 814, and a third ground pin 815 in sequence. The third signal terminal 82 includes a third contact portion 821, a third horizontal portion 822, a third curved portion 823, a third vertical portion 824, a third bent portion 825, and a third signal pin 826 in sequence. The third shielding piece 85 includes a plurality of convex portions 851 and a plurality of surrounding portions 852. The features of the third terminal group 8 are similar to those of the first terminal group 6, and the positional matching relationships of the components are the same. Details can be referred to the above detailed description, which will not be repeated here.

The fourth terminal group 9 includes a plurality of fourth ground terminals 91, a plurality of fourth signal terminals 92, a fourth insulating horizontal seat 93, a fourth insulating vertical seat 94 and a fourth shielding piece 95. Each fourth ground terminal 91 includes a fourth contact portion 911, a fourth horizontal portion 912, a fourth curved portion 913, a fourth vertical portion 914, and a fourth ground pin 915 in sequence. The fourth signal terminal 92 includes a fourth contact portion 921, a fourth horizontal portion 922, a fourth curved portion 923, a fourth vertical portion 924, a fourth bent portion 925, and a fourth signal pin 926 in sequence. The fourth shielding piece 95 includes a plurality of convex portions 951 and a plurality of surrounding portions 952. The features of the second terminal group 9 are similar to those of the first terminal group 6, and the positional matching relationships of the components are the same. Details can be referred to the above detailed description, which will not be repeated here.

The first terminal group 6 and the second terminal group 7 are stacked and assembled into the first assembly cavity 111 of the insulating housing 1. Two lateral sides of the first insulating horizontal seat 63 are received in the first assembly groove 113 so as to fix the first terminal group 6 in the first assembly cavity 111. The first contact portions 611, 621 extend into the first insertion portion 12 from the first horizontal portions 612, 622. The first contact portions 611, 621 are arranged on one side of the first insertion portion 12 and protrude into the first slot 121. Two lateral sides of the second insulating horizontal seat 73 are received in the second assembly groove 114 so at to fix the second terminal group 6 in the first assembly cavity 111. The second contact portions 711, 721 extend into the first insertion portion 12 from the first horizontal portions 712, 722. The second contact portions 711, 721 are arranged on the other side of the first insertion portion 12 and protrude into the first slot 121. Therefore, upper and lower surfaces of the first daughter card X1, when it is inserted into the first slot 121, can make elastic contact with the first contact portions 611, 621 and the second contact portions 711, 721, respectively.

The third terminal group 8 and the fourth terminal group 9 are stacked and assembled into the second assembly cavity 112 of the insulating housing 1. Two lateral sides of the third insulating horizontal seat 83 are received in the third assembly groove 115 so as to fix the third terminal group 8 in the second assembly cavity 112. The third contact portions 811, 821 extend into the second insertion portion 13 from the third horizontal portions 812, 822. The third contact portions 811, 821 are arranged on one side of the second insertion portion 13 and protrude into the second slot 131. Two lateral sides of the fourth insulating horizontal seat 93 are received in the fourth assembly groove 116 to fix the fourth terminal group 9 in the second assembly cavity 112. The fourth contact portions 911, 921 extend into the second insertion portion 13 from the fourth horizontal portions 912, 922. The fourth contact portions 911, 921 are arranged on the other side of the second insertion portion 13 and protrude into the second slot 131. Therefore, upper and lower surfaces of the second daughter card X2, when it is inserted into the second interface 131, can make elastic contact with the third contact portions 811, 821 and the fourth contact portions 911, 921, respectively.

The first insulating horizontal seat 63, the second insulating horizontal seat 73, the third insulating horizontal seat 83 and the fourth insulating horizontal seat 93 are stacked. The first insulating vertical seat 64, the second insulating vertical seat 74, the third insulating vertical seat 84 and the fourth insulating vertical seat 94 are arranged side by side. In order to ensure the stability of the high-speed connector 100, the first insulating vertical seat 64, the second insulating vertical seat 74 and the third insulating vertical seat 84 are positioned by the bottom spacer 5. Corresponding positioning cavities 51 are provided on the bottom spacer 5 for receiving and positioning the first insulating vertical seat 64, the second insulating vertical seat 74 and the third insulating vertical seat 84, respectively. In the illustrated embodiment of the present disclosure, the surrounding portions 652 of the two first shielding pieces 65 enclose a bottom portion of the first insulating vertical seat 64, the surrounding portions 752 of the two second shielding pieces 75 enclose a bottom portion of the second insulating vertical seat 74, and the surrounding portions 852 of the two third shielding pieces 85 enclose a bottom portion of the third insulating vertical seat 84. The surrounding portions 652 of the two first shielding pieces 65, the surrounding portions 752 of the two second shielding pieces 75, and the surrounding portions 852 of the two third shielding pieces 85 are respectively received in the positioning cavities 51 so as to be restricted by the bottom spacer 5. The first ground pins 615 and the first signal pins 626 of the first terminal group 6, the second ground pins 715 and the second signal pins 726 of the second terminal group 7, the third ground pins 815 and the third signal pins 826 of the third terminal group 8, and the fourth ground pins 915 and the fourth signal pins 926 of the fourth terminal group 9 are inserted into the corresponding insertion holes S1 of the circuit board S, so that the high-speed connector 100 can be mounted to the circuit board S.

The above embodiments are only used to illustrate the present disclosure and not to limit the technical solutions described in the present disclosure. The understanding of this specification should be based on those skilled in the art. Descriptions of directions, such as “front”, “back”, “left”, “right”, “top” and “bottom”, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A high-speed connector, comprising:

an insulating body defining a slot, the slot extending along a longitudinal direction and being configured to receive a daughter card in the longitudinal direction; and a terminal module fixed to the insulating body, the terminal module comprising a plurality of terminal groups, each terminal group comprising a plurality of ground terminals, a plurality of signal terminals and two shielding pieces, each ground terminal comprising a ground contact arm and a ground pin, each signal terminal comprising a signal contact arm and a signal pin, each shielding piece comprising a plurality of convex portions and a plurality of surrounding portions, and each surrounding portion of a same shielding piece connecting adjacent convex portions of the same shielding piece;

wherein the ground contact arms of the plurality of ground terminals and the signal contact arms of the plurality of signal terminals are disposed side-by-side along a transverse direction perpendicular to the longitudinal direction;

wherein the ground contact arms of the plurality of ground terminals and the signal contact arms of the plurality of signal terminals extend into the slot for engaging with the daughter card;

wherein each shielding piece extends along a vertical direction, perpendicular to both the longitudinal direction and the transverse direction, to a height which is much larger than a thickness of each shielding piece extending along the longitudinal direction; and wherein the ground pins and the signal pins are spaced apart and distributed in a staggered manner; the convex portions of one of the two shielding pieces are in contact with corresponding ground terminals on one side, and the convex portions of a remaining one of the two shielding pieces are in contact with the corresponding ground terminals on an opposite side, so that the two shielding pieces form a skirt to surround corresponding signal pins in the vertical direction.

2. The high-speed connector according to claim 1, wherein each shielding piece is of a wave-shaped configuration, and the convex portions and the surrounding portions of the same shielding piece are alternately and continuously arranged.

3. The high-speed connector according to claim 1, wherein at least one of the surrounding portions is of a U-shaped configuration.

4. The high-speed connector according to claim 1, wherein the ground pins and the signal pins of the terminal group are arranged in different rows and different columns, and the convex portions are in contact with the ground pins from intervals between adjacent signal pins.

5. The high-speed connector according to claim 1, wherein one or two ground pins are provided inside a single surrounding portion.

6. The high-speed connector according to claim 1, wherein the ground pins of the terminal group are arranged in a row; the signal pins of the terminal group are arranged in two rows and arranged on both sides of the ground pins; the two shielding pieces are arranged symmetrically along the row of the ground pins; and the surrounding portions of the two shielding pieces are opened opposite to each other.

7. The high-speed connector according to claim 1, wherein the two shielding pieces are of a two-piece configuration.

8. The high-speed connector according to claim 1, wherein the terminal group comprises an insulating seat, the ground terminals and the signal terminals are fixed to the insulating seat, at least one of the two shielding pieces comprises a snap hole, and the insulating seat comprises a snap post received in the snap hole.

9. The high-speed connector according to claim 8, wherein the insulating body comprises a base portion, a first insertion portion and a second insertion portion, the first insertion portion and the second insertion portion extend from the base portion, the first insertion portion and the second insertion portion are spaced apart and aligned with each other along the vertical direction, the terminal group is of a right-angle configuration, the insulating seat comprises an insulating horizontal seat and an insulating vertical seat, the insulating horizontal seat is assembled to the base portion, and the terminal module further comprises a bottom spacer to fix the insulating vertical seat.

10. The high-speed connector according to claim 9, further comprising a rear cover which fixes the terminal module to the base portion, the rear cover comprises a locking arm, and the base portion comprises a locking groove to lock with the locking arm.

11. A high-speed connector, comprising:

an insulating body; and a terminal module fixed to the insulating body, the terminal module comprising a plurality of terminal groups, each terminal group comprising a plurality of ground terminals, a plurality of signal terminals and two shielding pieces, each ground terminal comprising a ground pin, each signal terminal comprising a signal pin, each shielding piece comprising a plurality of convex portions and a plurality of surrounding portions, and each surrounding portion of a same shielding piece connecting adjacent convex portions of the same shielding piece;

wherein the ground pins and the signal pins are spaced apart and distributed in a staggered manner; the convex portions of one of the two shielding pieces are in contact with corresponding ground terminals on one side, and the convex portions of a remaining one of the two shielding pieces are in contact with the corresponding ground terminals on an opposite side; and wherein each surrounding portion of one of the two shielding pieces has a first opening; each surrounding portion of a remaining one of the two shielding pieces has a second opening; the first opening and a corresponding second opening form a rectangular opening in which two signal pins reside; and wherein the two signal pins are disposed along a diagonal of the rectangular opening.

12. The high-speed connector according to claim 11, wherein each surrounding portion is of a U-shaped configuration.

13. The high-speed connector according to claim 12, wherein the ground pins and the signal pins of the terminal group are arranged in different rows and different columns.

14. The high-speed connector according to claim 13, wherein the ground pins of the terminal group are arranged in a row, the signal pins of the terminal group are arranged in two rows and arranged on both sides of the ground pins, and the two shielding pieces are arranged symmetrically along the row of the ground pins.

15. The high-speed connector according to claim 11, wherein the terminal group comprises an insulating seat, the ground terminals and the signal terminals are fixed to the insulating seat, each shielding piece comprises a snap hole, and the insulating seat comprises a snap post received in the snap hole.

16. The high-speed connector according to claim 15, wherein the insulating body comprises a base portion, a first insertion portion and a second insertion portion, the first insertion portion and the second insertion portion extend from the base portion, the first insertion portion and the second insertion portion are spaced apart and aligned with each other along a vertical direction, the terminal group is of a right-angle configuration, the insulating seat comprises an insulating horizontal seat and an insulating vertical seat, the insulating horizontal seat is assembled to the base portion, and the terminal module further comprises a bottom spacer to fix the insulating vertical seat.

17. The high-speed connector according to claim 16, wherein the first insertion portion defines a first slot for insertion of a first daughter card; the second insertion portion defines a second slot for insertion of a second daughter card which is in parallel with the first daughter card; both the first slot and the second slot extend along a horizontal direction.

18. A high-speed connector, comprising:

an insulating body; and a terminal module fixed to the insulating body, the terminal module comprising a plurality of terminal groups, each terminal group comprising a plurality of ground terminals, a plurality of signal terminals and two shielding pieces, each ground terminal comprising a ground pin, each signal terminal comprising a signal pin, each shielding piece comprising a plurality of convex portions and a plurality of surrounding portions, and each surrounding portion of a same shielding piece connecting adjacent convex portions of the same shielding piece;

wherein the ground pins and the signal pins are spaced apart and distributed in a staggered manner; the convex portions of one of the two shielding pieces are in contact with corresponding ground terminals on one side, and the convex portions of a remaining one of the two shielding pieces are in contact with the corresponding ground terminals on an opposite side;

wherein the two shielding pieces are of a two-piece configuration and are assembled along opposite directions along a horizontal direction; and wherein the ground pins of the terminal group are arranged in a row; the signal pins of the terminal group are arranged in two rows and arranged on both sides of the ground pins; the two shielding pieces are arranged along the row of the ground pins; opposite sides of the ground pins are in contact with the two shielding pieces, respectively; and the surrounding portions of the two shielding pieces are opened opposite to each other.

19. The high-speed connector according to claim 18, wherein the two shielding pieces are arranged symmetrically along the row of the ground pins.

20. The high-speed connector according to claim 19, wherein each surrounding portion of one of the two shielding pieces has a first opening; each surrounding portion of a remaining one of the two shielding pieces has a second opening; the first opening and a corresponding second opening form a rectangular opening in which two signal pins reside; and wherein the two signal pins are disposed along a diagonal of the rectangular opening.

* * * * *